P. LANDIS.
CARBURETER.
APPLICATION FILED JAN. 30, 1919.

1,398,640.

Patented Nov. 29, 1921.

Inventor
P. Landis
By H. R. Kerslake
Atty

UNITED STATES PATENT OFFICE.

PAUL LANDIS, OF ZURICH, SWITZERLAND.

CARBURETER.

1,398,640.  Specification of Letters Patent.  Patented Nov. 29, 1921.

Application filed January 30, 1919. Serial No. 274,074.

*To all whom it may concern:*

Be it known that I, PAUL LANDIS, a citizen of Switzerland, residing at Zurich, Republic of Switzerland, have invented certain new and useful Improvements in Carbureters, of which the following is a specification.

This invention relates to a carburetor for internal combustion engines, which can be used for liquid or gaseous fuels.

The present invention has for its object to provide a fuel jet which can be adjusted from without during running. The carbureter dispenses with a float and presents a considerable improvement especially for aeroplane engines, where when a float carbureter is used there is liable to be an overflow of the fuel when the aeroplane has a canted position.

A form of the carbureter constructed in accordance with the present invention is illustrated in the accompanying drawings.

Figure 1:
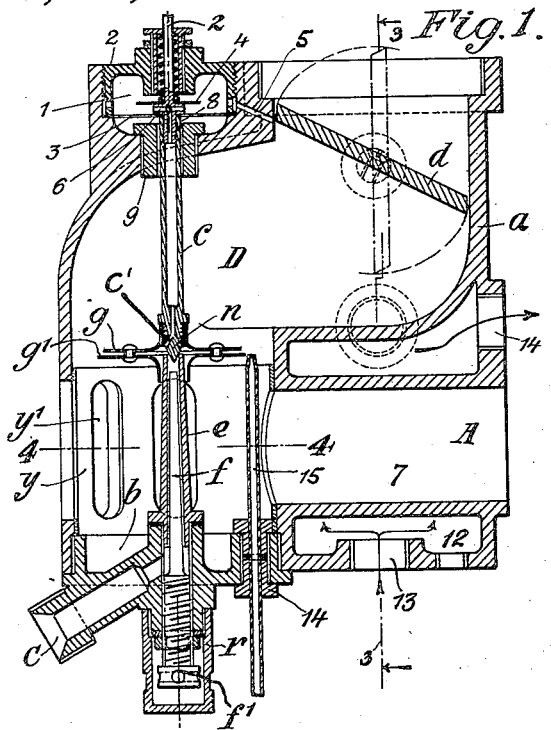
Figure 1 represents the embodiment of my invention in a longitudinal section on line 1—1, Fig. 2.
Figure 2:
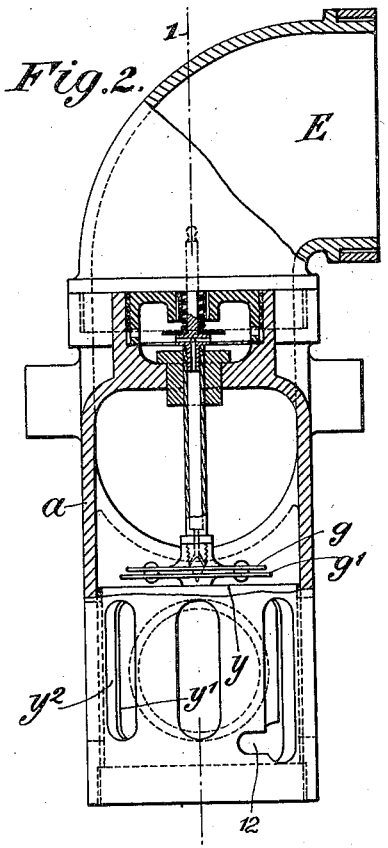
Fig. 2 is a partial section on the line 2—2 of Fig. 1 and showing a coupling E connected with the carburetor.
Figure 3:
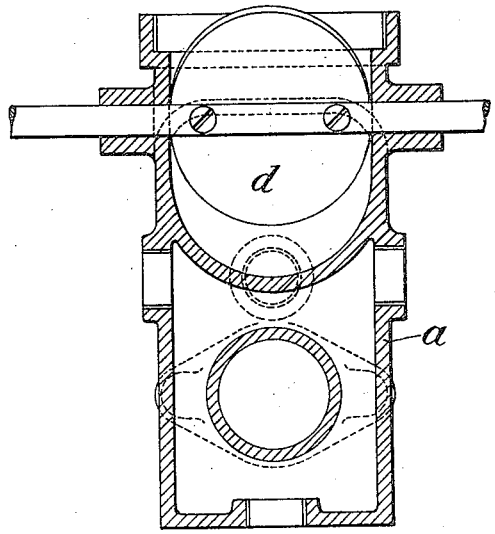
Fig. 3 is a section on line 3—3, Fig. 1
Figure 4:
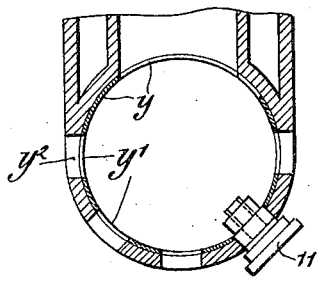
Fig. 4 is a section on line 4—4, Fig. 1.

In Figs. 1 to 4 $a$ designates the casing of the carbureter, and $b$ a plug screwed in said casing. The fuel supply pipe (not shown) is connected at C, and the jet body $e$ is screwed in said plug $b$. The fuel valve $f$ is screw threaded at its lower part to work in a corresponding thread in the plug $b$, the cap $r$ protects the lower end of the fuel valve $f$. The end $f'$ of the valve $f$ has holes for adjusting it and by adjustment of the valve $f$ the passage to the jet can be regulated as desired. The aperture of the jet $e$ is closed by the hollow valve $c$ having a conical end $n$, the upper end of the valve is received in a wide opening of the plug 9; said opening permits air to pass from the chamber D to the chamber 1. Two plates $g$ and $g'$ are fixed on the valve, the lower plate $g'$ surrounds the aperture of the jet $e$. The hollow space or bore of the valve $c$ communicates by channels $c'$ with the space inclosed by the plates $g$ and $g'$. The admission of the air to the mixing chamber D is controlled by a ring $y$ having slots $y'$, said ring being arranged to be rotatable on the plug $b$, so that the slots $y^2$ in the casing $a$ can be more or less covered. The mixing chamber D can be closed by a throttle valve $d$, for this purpose a hand-gear (not shown) is provided.

The chamber 1 at the upper port of the carburetor casing or body $a$ is closed by a plug 2 and a diaphragm 3 is arranged in the chamber below the plug, the central portion of the diaphragm being confined under a member 8 having a plurality of ports therein establishing communication between the interior of the valve $c$ and the chamber at the top of the diaphragm 3. The opening movement of the valve $e$ is limited by a plate 4, a spring $9^a$ being so confined between the plug 2 and the ported member 8 as to normally tend to move the valve $c$ downwardly and close the discharge end of the jet body $e$. The chamber 1 above the diaphragm 3 communicates with the mixing chamber $d$ by a passage 5.

The carburetor casing or body $a$ is provided with an extended tubular member 7 having a jacket 12 surrounding it for receiving heated water whereby the air entering the carburetor through the tubular member is heated. Suitable ports 13 and 14 are provided in the walls of the jacket 12 for connection with water pipes, as will be understood.

The liquid fuel enters at the nipple C and rises in the narrow channel between the jet $e$ and the valve $f$ to the jet aperture closed by the conical end $n$ of the valve $c$. In consequence of the suction the plates $g$ and $g'$ together with the valve $c$ are lifted by the current of air drawn through the carburetor body or casing $a$. As soon as the cone $n$ has been lifted, the liquid fuel flows out between the plates $g$ and $g'$ and a combustible mixture is formed by the contact of the liquid fuel with the incoming air.

When the engine is running light, the throttle $d$ is turned in the position shown in full lines in Fig. 1, in which the mixing chamber D is not completely closed, but the suction of the motor is largely confined to the duct 5 which terminates in the chamber 1 over the diaphragm 3. In this case the diaphragm $c$ is raised and the fuel rises in the hollow space of the valve $c$ and flows through the ports 6 of the member 8 and into the chamber 1 above the diaphragm 3 from where it is drawn through the passage 5 to the mixing chamber B. The liquid fuel entering the mixing chamber D is drawn above the throttle valve $d$ and is mixed with air drawn around the edge of said throttle valve.

By adjusting the valve $f$, the proportion of fuel to air may be varied during operation of the carbureter. The velocity of the air passing through the mixing chamber D may be readily varied by adjustment of the ring $y$. By the suction produced in the carbureter, the fuel is drawn over the upper edge of the jet $e$ through the narrow passage between the jet and the valve $f$. This passage is smallest at its upper part and widens downwardly, being of annular cross section throughout the length of the valve $f$.

It is evident that the carbureter may also be used with gaseous fuels. For this purpose another valve $f$ is preferably inserted in the jet body $e$ so that the passage between the jet $e$ and the valve $f$ is somewhat wider than that provided during the use of liquid fuel. The herein described carbureter may also be used with acetylene gas. In this case, the tube 15 which is received in the plug $b$ serves to introduce water into the mixing chamber D, a fluid-tight joint being established between the tube 15 and the plug $b$ by a suitable type of packing gland 14. The purpose of the introduction of water is to retard the ignition of the mixture.

What I claim is:—

1. In a carbureter, a body having an internal mixing chamber and air inlet ports communicating therewith, a supplemental chamber in said body, a fuel jet arranged in the mixing chamber, a fluid pressure actuated valve associated with the jet having a passage communicating with the second mentioned chamber whereby liquid fuel from the discharge aperture of the jet is conducted to the latter, said body having a passage connecting the first and second mentioned chambers, a throttle valve arranged adjacent the passage, and supplemental valve controlling means arranged in the second mentioned chamber.

2. In a carbureter, a body having a mixing chamber and inlet ports communicating therewith, a chamber in said body, a liquid fuel jet having a discharge aperture located in the mixing chamber, a spring closed valve associated with the discharge aperture of the jet and having a longitudinal opening adapted to conduct liquid fuel from the discharge aperture of the jet to the second mentioned chamber, a throttle valve located in the body, said body having a passage terminating adjacent the throttle valve and communicating with the second mentioned chamber, and a diaphragm located in the second mentioned chamber connected with the valve whereby the latter is actuated by the production of a depression in the second mentioned chamber.

3. In a carbureter, a body having an internal mixing chamber and air inlet ports communicating therewith, a supplemental chamber in said body, a fuel jet arranged in the mixing chamber, spaced distributing plates arranged about the discharge end of said jet a fluid pressure actuated valve associated with the jet having a passage communicating with the second mentioned chamber whereby liquid fuel from the space between said plates is conducted to the latter, said body having a passage connecting the first and second mentioned chambers, a throttle valve arranged adjacent the passage, and supplemental valve controlling means arranged in the second mentioned chamber.

In testimony whereof, I have affixed my signature.

PAUL LANDIS.